(12) United States Patent
Chini et al.

(10) Patent No.: US 8,638,895 B2
(45) Date of Patent: Jan. 28, 2014

(54) EXTENSION OF ETHERNET PHY TO CHANNELS WITH BRIDGED TAP WIRES

(75) Inventors: Ahmad Chini, Mission Viejo, CA (US); Mehmet Tazebay, Irvine, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/409,537

(22) Filed: Mar. 1, 2012

(65) Prior Publication Data
US 2013/0230091 A1 Sep. 5, 2013

(51) Int. Cl.
*H04L 7/00* (2006.01)

(52) U.S. Cl.
USPC ........... 375/366; 375/220; 375/222; 375/226; 375/227; 375/229; 375/232; 375/233; 375/295; 375/316; 375/342; 375/360; 375/365; 375/367; 375/368; 375/371; 455/91; 455/130; 455/296; 455/501; 455/516; 370/335; 370/342; 370/509; 370/510; 370/516; 327/163

(58) Field of Classification Search
USPC ......... 375/220, 222, 226, 227, 229, 232, 233, 375/295, 316, 342, 350, 365, 366, 367, 368, 375/371; 455/91, 130, 296, 501, 516; 370/335, 342, 509, 510, 516; 327/163
See application file for complete search history.

(56) References Cited

U.S. PATENT DOCUMENTS

| | | | |
|---|---|---|---|
| 6,556,637 B1 * | 4/2003 | Moriuchi | 375/350 |
| 6,700,927 B1 * | 3/2004 | Esliger et al. | 375/222 |
| 7,359,132 B2 * | 4/2008 | Morling et al. | 360/40 |
| 2006/0125515 A1 | 6/2006 | Binder | |
| 2011/0026416 A1 | 2/2011 | Tazebay et al. | |
| 2011/0202781 A1 | 8/2011 | Wang et al. | |

OTHER PUBLICATIONS

Ahsan Aziz, Decision Feedback Equalizer for StarCore ® -Based DSPs, Freescale Semiconductor Application Note, AN2072, Rev. 2, Oct. 2007.

* cited by examiner

*Primary Examiner* — Leon Flores
(74) *Attorney, Agent, or Firm* — Thomas | Horstemeyer, LLP

(57) ABSTRACT

In one embodiment, receiving an Ethernet signal over a channel, the Ethernet signal comprising a preamble frame, an idle frame, and a data frame, the preamble frame comprising one or more preamble codes; synchronizing to the Ethernet signal based on the preamble frame; replicating the one or more preamble codes; and training a decision feedback equalizer (DFE) based on the one or more replicated codes, the training enabling the DFE to use decision values at the DFE output to track channel variations.

14 Claims, 6 Drawing Sheets

EXTENSION OF ETHERNET PHY TO CHANNELS WITH BRIDGED TAP WIRES

TECHNICAL FIELD

The present disclosure is generally related to Ethernet PHY systems and telephony.

BACKGROUND

High data rate (e.g., 100M, 1 G, and 10 G) Ethernet PHY systems as specified in IEEE 802.3 are designed to perform over categorized cables with predefined specifications. These categorized cables show a moderate amount of Inter Symbol Interference (ISI). Some form of ISI mitigation, and in particular, various forms of Decision Feedback Equalizers (DFE), are often used to combat ISI. DFE may comprise feedforward and feedback filters. In order to train the DFE and other signal processing blocks, the transmitter sends an idle signal before data communication starts. The idle signal is generated using a rather long scrambler specified in IEEE 802.3. The DFE is trained on the idle signal using decisions made at the equalizer output. This works well on the categorized cables specified in IEEE 802.3. When it comes to channels with severe ISI however, the Ethernet PHY specified in IEEE 802.3 does not, and is not intended, to work.

Multi carrier modulations and in particular various forms of coded Orthogonal Frequency Division Multiplexing (OFDM) are often used to operate over channels with more severe ISI. Despite many advantages offered by OFDM, systems using OFDM may suffer from higher power consumption and/or complexity in some applications. In addition, the system throughput may be reduced due to signaling overhead.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1A:
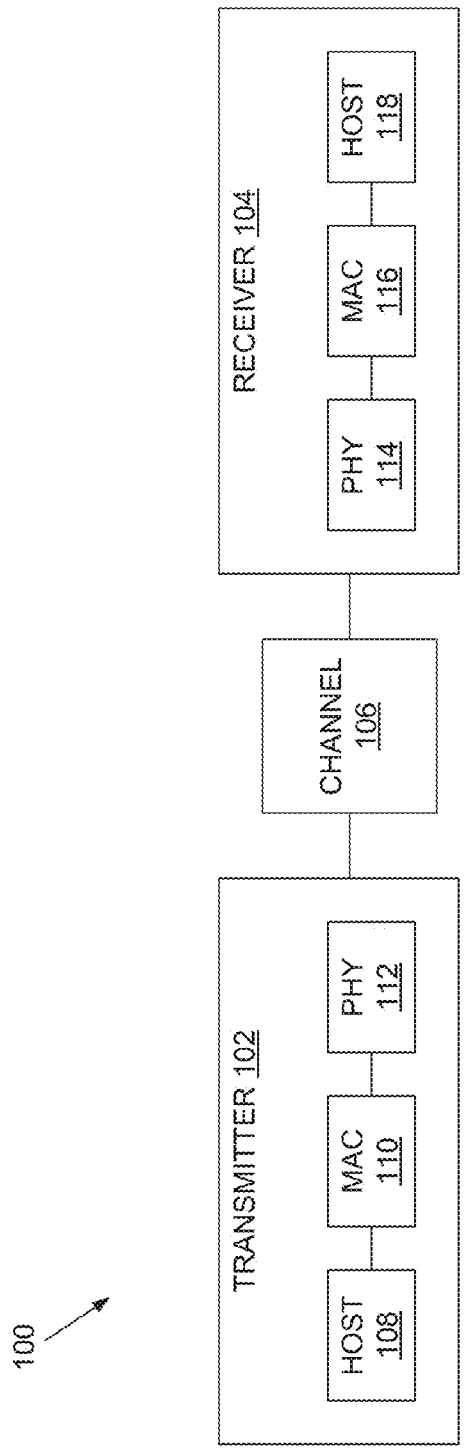
FIG. 1A is a block diagram that illustrates an example environment in which an embodiment of an extended Ethernet PHY system may be employed.

Certain embodiments of an invention comprising an extended Ethernet PHY system and method are disclosed that provide and process a training preamble added to IEEE 802.3 standard Ethernet frames in an effort to address cable types with severe Inter Symbol Interference (ISI). In one system embodiment, a preamble is transmitted by a transmitter, and on the receiver side, synchronization logic is used to establish synchronization (e.g., via determination of a preamble phase). Once the preamble synchronization is achieved, a local preamble generator produces the same code as generated in the transmitter, which is used to train a decision feedback equalizer (DFE). After training, any channel variation may be tracked using decision values at the output of the DFE. The transmitter may switch to normal Ethernet PHY idle signal frames and/or Ethernet data frames comprising idle symbols and/or data symbols, respectively, once the preamble is finished. In some embodiments, the same preamble may be used to adjust the receiver gain, frequency offset and sampling phase.

Digressing briefly, current IEEE standard Ethernet PHYs do not work on telephony wiring with bridged taps. Instead, most available products provide Ethernet support at their MAC interface, where the cost, power usage, latency and/or signaling overhead is substantially higher than IEEE standard Ethernet PHYs. Certain embodiments of an extended Ethernet PHY system may extend the benefits of Ethernet PHY to cable types with more severe ISI, such as bridged tap telephony wiring. The use of native Ethernet modulation and/or equalization techniques helps with integration of bridged tap solutions into the standard Ethernet PHY systems. Also, certain embodiments of an extended Ethernet PHY system enable software configurable solutions that work on bridged tap channels in addition to a standard Ethernet environment.

Having broadly summarized certain features of extended Ethernet PHY systems and methods of the present disclosure, reference will now be made in detail to the description of the disclosure as illustrated in the drawings. While the disclosure is described in connection with these drawings, there is no intent to limit the disclosure to the embodiment or embodiments disclosed herein. For instance, although described in the context of bridged tap telephony, it should be appreciated within the context of the present disclosure that some power line wirings and some coaxial cable networks may also benefit from application of certain embodiments of extended Ethernet PHY systems and methods. Although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Attention is directed to FIG. 1A, which illustrates an example environment 100 in which an embodiment of an extended Ethernet PHY system can be employed. One having ordinary skill in the art should appreciate in the context of the present disclosure that the example environment 100 is merely illustrative, and that extended Ethernet PHY systems may be implemented in other environments. As illustrated, a transmitter 102 communicates with one or more receivers, such as receiver 104, over a communications channel 106. The transmitter 102 and receiver 104 may be embodied in any one of a plurality of devices, including a switch, router, endpoint (e.g., computing device, such as a server, client, VOIP phone, wireless access point, etc.), or the like. The transmitter 102 comprises a host 108, media access control (MAC) 110, and a physical layer device (PHY) 112, while the receiver 104 includes a PHY 114, MAC 116, and host 118.

In general, the hosts 108 and 118 may comprise suitable logic, circuitry, and/or code that may enable operability and/or functionality of the five highest functional layers of an OSI model for data packets that are to be transmitted over the link. Since each layer in the OSI model provides a service to the immediately higher interfacing layer, the MACs 110 and 116 may provide the necessary services to hosts 108 and 118 to ensure that packets are suitably formatted and communicated to the PHYs 112 and 114. The MACs 110 and 116 may comprise suitable logic, circuitry, and/or code that may enable handling of data link layer (Layer 2) operability and/or functionality. The MACs 110 and 116 can be configured to implement Ethernet protocols, such as those based on the IEEE 802.3 standard, for example. The PHYs 112 and 114 can be configured to handle physical layer requirements, which include, but are not limited to, packetization, data transfer and serialization/deserialization (SERDES). Certain embodiments of an extended Ethernet PHY system are implemented at the PHY layer, as described further below.

The transmitter 102 and receiver 104 may operate according to one of a plurality of subrating schemes. For instance, one scheme involves subrating through the use of a low power idle (LPI) technique. In general, LPI relies on turning the active channel 106 silent when there is nothing to transmit. Energy is thereby saved when the channel 106 (e.g., link) is off. Refresh signals can be sent periodically to enable wake up from the sleep mode. In one embodiment, a sync signal can be used on the interfaces (e.g., medium dependent interface (MDI) and MAC/PHY interface) to allow for a quick wake up from the sleep mode and maintain frequency lock. For example, on the MDI interface for a 10 GBASE-T signal, a simple PAM2 pseudorandom bit sequence may be used on a given wiring pair during the LPI mode.

As would be appreciated, the channel 106 may operate at standard or non-standard (e.g., 2.5 G, 5 G, 10 G, etc.) link rates, as well as other link rates (e.g., 40 G, 100 G, etc.). The channel 106 may also be supported by various port types (e.g., backplane, twisted pair, optical, etc.) and in various applications (e.g., Broadreach Ethernet, EPON, etc.). Of particular focus for purposes of the present disclosure is a channel configuration comprising bridged tap telephony wiring, as shown in FIG. 1B.

Figure 1B:
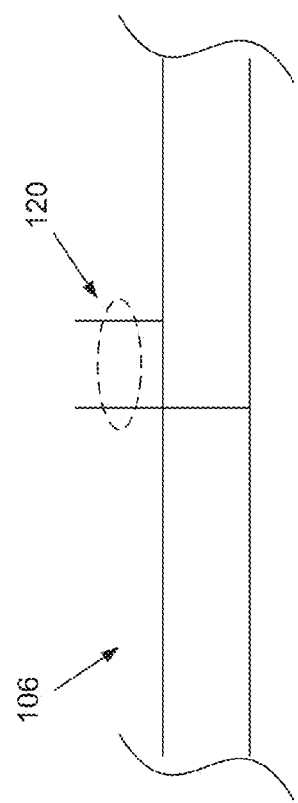
FIG. 1B is a schematic diagram that illustrates an example channel feature where certain embodiments of extended Ethernet PHY system may be applied.

Referring now to FIG. 1B, the channel 106 comprises a line with one or more extra twisted wire pairs, such as extra twisted pair 120, spliced onto the main line, the spliced-on wire pair 120 referred to as a bridged tap. The bridged tap 120 may be present at various locations in a premise (e.g., office, residential room, etc.) and coupled to a port (e.g., RJ45) to offer telephony and/or Ethernet services. In embodiments with applications directed to power or coaxial cabling, the bridged tap 120 may correspond to coupling to the communications network (e.g., cable tap) to an existing premise (e.g., house) or available yet-uncoupled to a premise (e.g., where there is no residence at the tap location, such as routed to a property in a newly developed community of housing where no living structure is disposed). The bridged tap 120 reflects signals from the termination end, and may cause the reflected signals to travel back to the main line and interfere with other signals. The most harmful interference occurs when the reflected signal is out of phase with the incoming signal. In such a case, the reflected signal destructively interferes with the incoming signal on the main line. One such case of interference is ISI, which causes distortion among symbols transmitted by the transmitter 102 and received over the channel 106 by the receiver 104.

Figure 2:
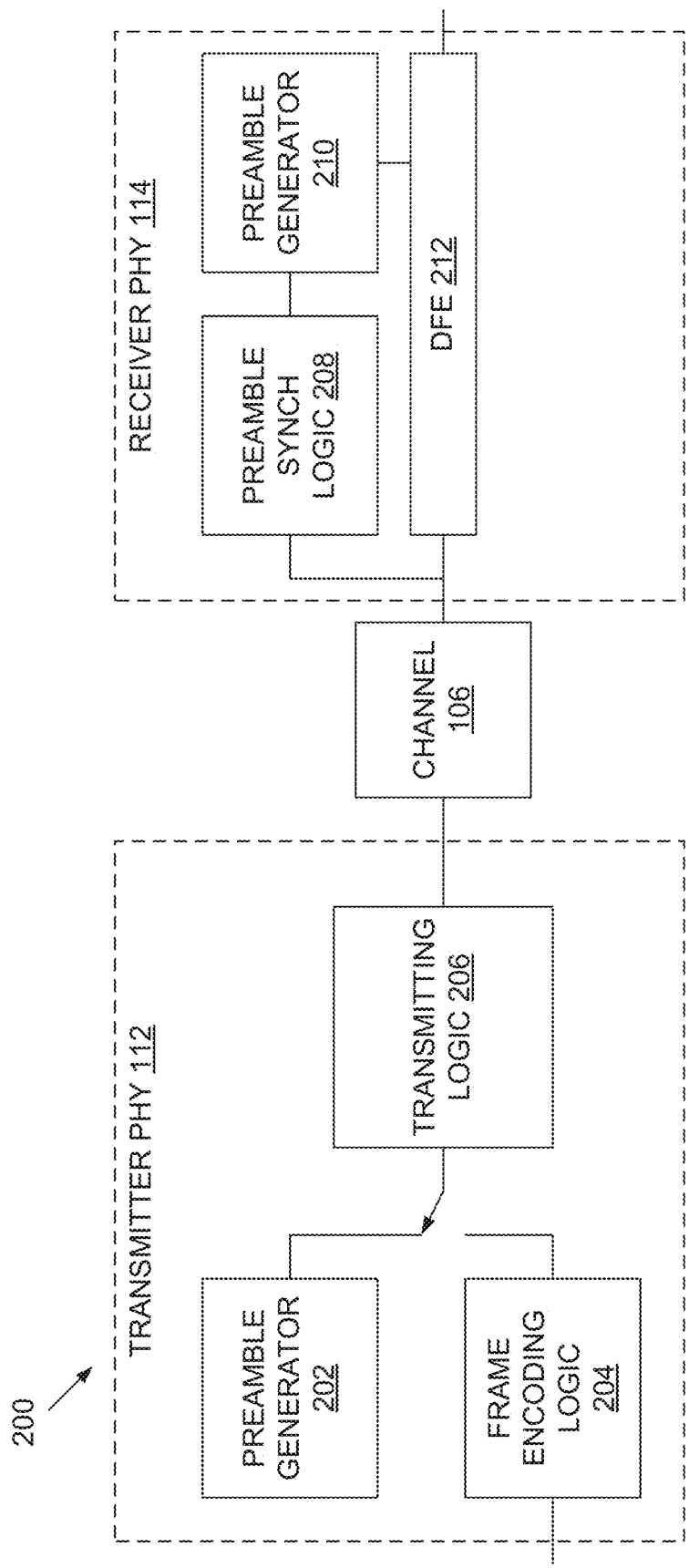
FIG. 2 is a block diagram that illustrates one embodiment of an extended Ethernet PHY system.

Referring to FIG. 2, shown is one embodiment of an extended Ethernet PHY system 200 that may mitigate ISI in bridged tap configurations, among other wiring configurations. In some embodiments, functionality of the extended Ethernet PHY system 200 may be embodied in a subset of the components illustrated in FIG. 2, or in some embodiments, extended to additional components. The extended Ethernet PHY system 200 comprises the transmitter PHY 112 and the receiver PHY 114 communicatively coupled to one another over the channel 106. The transmitter PHY 112 comprises a preamble generator 202, and well-known frame encoding logic 204 and transmitting logic 206. The frame encoding logic 204 is configured to provide alternating idle and data frames to the transmitting logic 206 for transmittal over the channel 106. The receiver PHY 114 comprises a preamble synch logic 208 coupled to a preamble generator 210, and a decision feedback equalizer (DFE) 212 coupled to the preamble generator 210 and the channel 106. Also included in the receiver PHY 114 (and transmitter PHY 112) are wellknown components, omitted here to avoid obscuring more relevant features, such components configured for performing de-packetization, deserialization, among other known PHY receiver functionality.

In operation, the preamble generator 202 generates a preamble frame comprising one or more symbols or codes as explained below, the preamble switchably provided to the transmitting logic 206 as a precursor to the idle and data frames provisioned by the frame encoding logic 204. The frame encoding logic 204 may provide the transmitting logic 206 with normal Ethernet PHY idle and data symbols once the preamble is finished and passed to the transmitting logic 206. The transmitting logic 206 receives the preamble frame (and subsequent idle and then data frames) and transmits the same over the channel 106 to the receiver PHY 114. At the receiver PHY 114, the preamble synchronization logic 208 receives the preamble and establishes a preamble phase (e.g., synchronizes to the preamble). Once the preamble synchronization is achieved, the preamble synchronization logic 208 provides the preamble to the preamble generator 210, which produces the same code as generated in the transmitter PHY 112. In other words, the preamble generator 210 replicates the code provided by the transmitting logic 206, and this replica code is passed to the DFE 212 to train the DFE. After initial training, the channel variation may be tracked using the decision values at the output of the DFE 212. The frame encoding logic 204 provides the balance of the frames to the transmitting logic 206 for transmission over the channel 106 to the receiver 104 when the training is complete and the link is established. The same preamble (e.g., that is sent from the transmitter 102) may be used to adjust the receiver gain, frequency offset and sampling phase.

Figure 3:
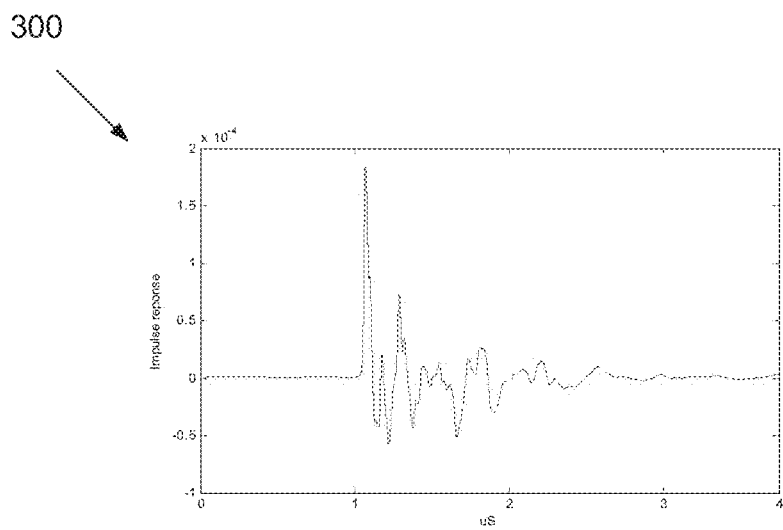
FIG. 3 is a schematic diagram that illustrates an example impulse response for a bridged tap channel.
Figure 4:
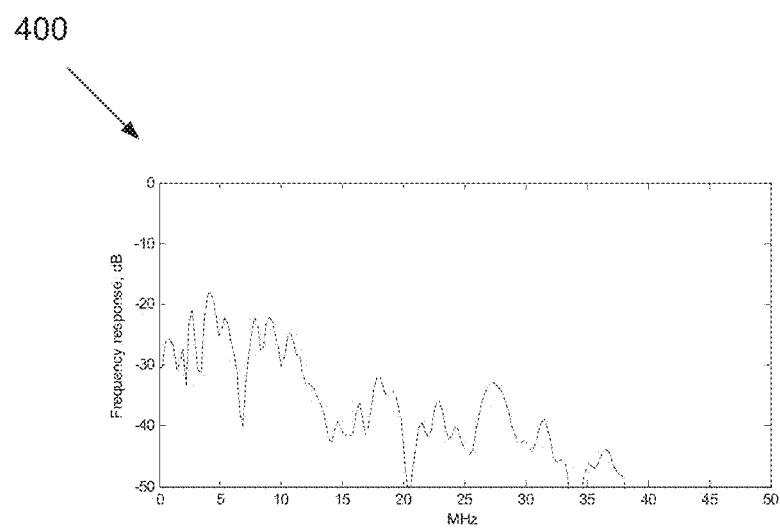
FIG. 4 is a schematic diagram that illustrates an example frequency response of an example bridged tap channel.

Explaining preamble generation further, attention is directed to FIGS. 3-4, which illustrate respectively an example impulse response 300 (FIG. 3) and frequency response 400 (FIG. 4) of example telephony wiring with one or more bridged taps. Digressing briefly, it is well known that using a feed forward equalizer may lead to extreme noise enhancement given the deep nulls shown in FIG. 3. Using an equalizer with a decision feedback section or DFE, such as DFE 212, provides better performance on such channels. The DFE 212 should be long enough to cover the large delay spread shown in FIG. 3. With decision directed training, however, the DFE 212 may not be initialized to the point where correct decisions are obtained. This is due to the fact that the channel response for a given bridged tap channel is unknown and channel adaptation may not be achieved on erroneous decisions. If a receiver is synchronized to the transmit idle signal, then the DFE can be trained using a replica of the transmit signal generated in the receiver. One option to provide synchronization is to use a cross correlator to the transmit idle signal. The long period of the idle signal defined in IEEE 802.3 makes this approach of a lesser or no value because of incured correlator complexity and the delay in achieving synchronization.

The extended Ethernet PHY system 200 serves as one solution to the above-described options by using a periodic preamble comprising one or more short codes added to the idle signal. This provides fast and lower complexity synchronization. The synchronized receiver PHY 114 is then able to produce the same code or codes to initialize DFE training.

By using a shorter code, faster and lower complexity synchronization may be achieved. The code should be longer than the DFE 212 to allow correct initialization and adaptation to the channel, yet long enough to mitigate or remove ISI in the channel 106. In addition, a larger DFE and a longer preamble period may be considered for higher data rates. One method to determine the length of the DFE 212 is to base the length on the channel delay spread, which for a channel with the example responses 300 and 400, is about 3us (microseconds), though not limited to either this value or the illustrated example responses. In one embodiment, the preamble generator 202 generates a periodic preamble containing pseudo random codes with white spectrum. The preamble should have a period greater than the DFE length. There are multiple ways to generate good preambles. In one embodiment, the preamble generator 202 comprises a Linear Feedback Shift Register (LFSR), and hence the preamble may be generated using a Linear Feedback Shift Register (LFSR) with non-return to zero (NRZ) coding. For example, an 8 bit-LFSR generates a preamble with a period of 255 symbols. This may be good enough for a 100M data link over the channel responses 300 and 400 shown in FIGS. 3 and 4, respectively. In one embodiment, the preamble generator 202 may use the following generated polynomial:

$g(x)=x^8+x^6+x^5+x4+1$

At the receiver PHY side, the preamble synchronization logic 208 may be configured in one embodiment with a cross correlator filter. Then, to achieve synchronization, the cross correlator filter (e.g., with the same length of 255) may be used in the receiver PHY 114. The output of such a filter shows the channel impulse response, which is used to establish synchronization.

Note that in some embodiments, there may be alternative ways that are used to reduce the receiver complexity even further. For example, the preamble synchronization logic 208 may use repeated impulse codes as part of the transmit preamble (e.g., a binary digit of one (1) followed by 254 zeros with NRZ coding). The channel impulse response is then obtained in the receiver PHY 114 with no need to use a correlator.

Figure 5:
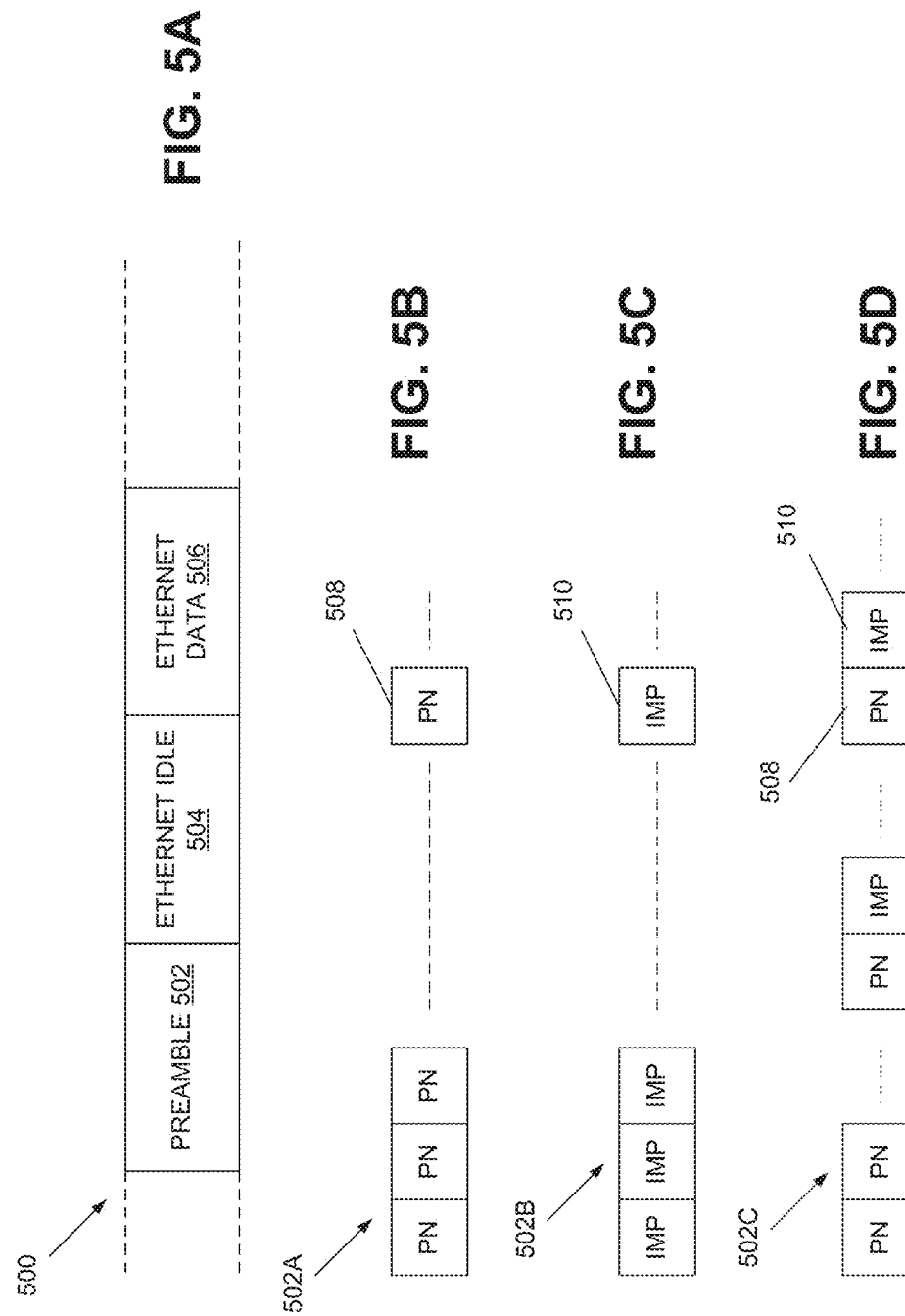
FIG. 5A is a schematic diagram that illustrates an example packet structure used by an embodiment of an extended Ethernet PHY system.
FIG. 5B is a schematic diagram that illustrates an example embodiment of a preamble structure.
FIG. 5C is a schematic diagram that illustrates an example embodiment of another preamble structure.
FIG. 5D is a schematic diagram that illustrates an example embodiment of another preamble structure.

Attention is now directed to FIGS. 5A-5D, which illustrate some example transmit frame formats with the preamble added to the normal Ethernet frames. Referring to FIG. 5A, the transmit frame format 500 comprises a preamble frame 502, followed by an Ethernet idle frame 504, which is followed by an Ethernet data frame 506. In one embodiment, referring to FIG. 5B, the preamble frame 502A may comprises plural pseudo random (PN) codes 508. In the embodiment depicted in FIG. 5C, the preamble frame 502B may comprise plural impulse (IMP) codes 510. In another embodiment, the preamble frame 502C may comprise a combination of PN 508 and IMP 510 codes. In some embodiments, the preamble frame 502 may comprise a chirp or other forms of wide band codes instead of (or in some embodiments, in combination with) a PN and/or IMP sequence.

Note that although certain embodiments have been described in the context of time synchronization on the basis of a periodic preamble, some embodiments of an extended Ethernet PHY system 200 may utilize non-periodic preambles. However, by implementing time synchronization on the basis of periodic preamble generation, certain transmit/receive functionality and/or features may be facilitated, such as frequency offset correction, reduced complexity time synchronizer design, among others.

In addition, though described in relation to DFE training, it should be appreciated within the context of the present disclosure that preamble generation and/or replication may facilitate various receiver functions including signal detection, gain, frequency and phase controls.

Note that in addition to synchronization and initial training, the modulation levels (e.g., as provided via the transmitting logic 206) should be selected in a manner that reduces the chance of error propagation in the DFE 212. Lower level signaling, such as for PAM2 and PAM3, may be considered for data communication if no forward error correction (FEC) or other error mitigation methods are used to reduce the chance and alleviate error propagation in the DFE 212.

The extended Ethernet PHY system 200 can be implemented in hardware, software, firmware, or a combination thereof. In embodiments where the extended Ethernet PHY system 200, or portions thereof, is implemented in software or firmware, such software and/or firmware may be stored in a memory and is executed by a suitable instruction execution system (e.g., in the host). In embodiments where the extended Ethernet PHY system 200, or portions thereof, is implemented in hardware, the hardware can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
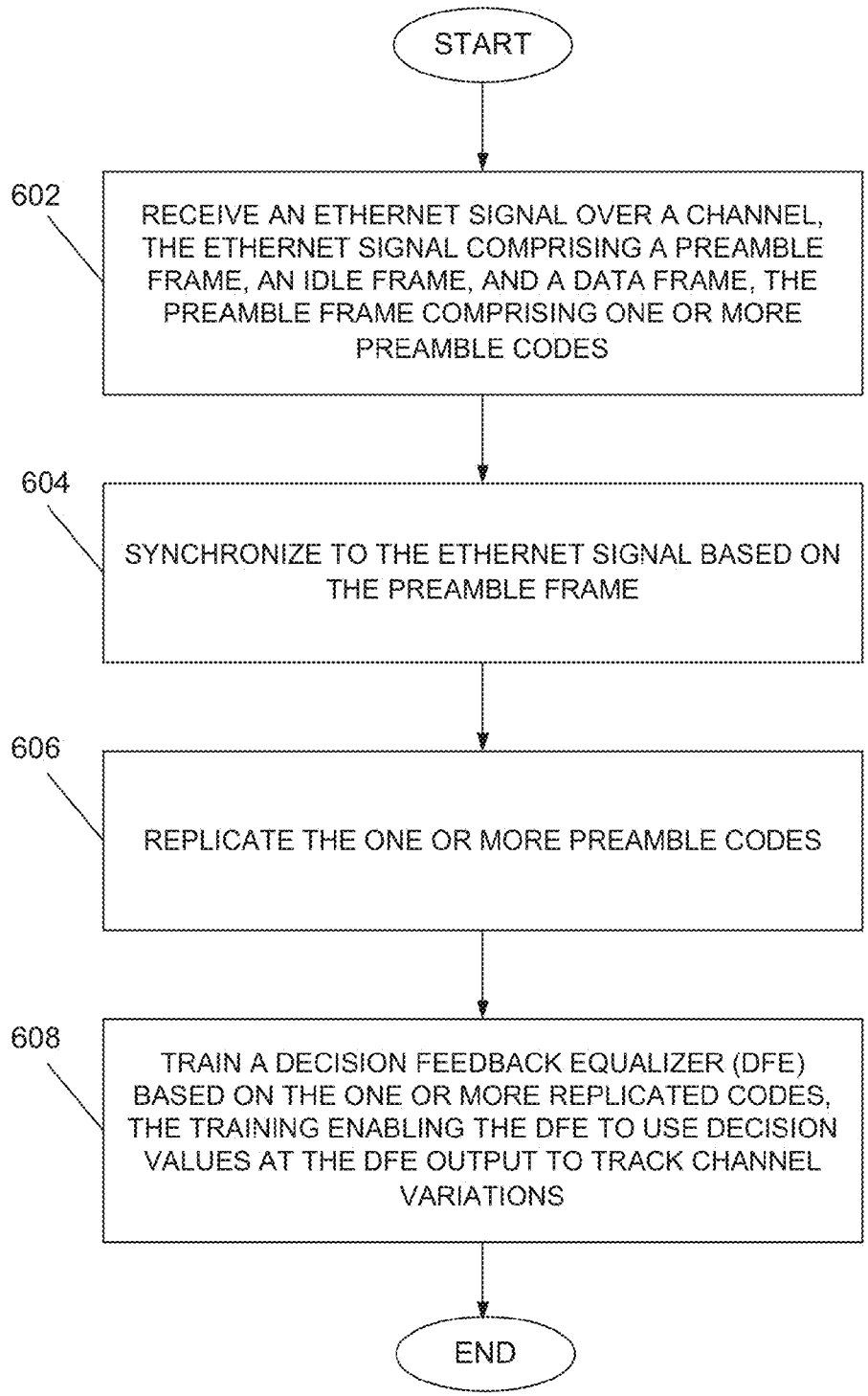
FIG. 6 is a flow diagram that illustrates an example embodiment of an extended Ethernet PHY method from a receiving perspective.

Having described certain embodiments of an extended Ethernet PHY system 200, it should be appreciated that one method embodiment, denoted as method 600 and illustrated in FIG. 6, comprises receiving an Ethernet signal over a channel, the Ethernet signal comprising a preamble frame, an idle frame, and a data frame, the preamble frame comprising one or more preamble codes (602); synchronizing to the Ethernet signal based on the preamble frame (604); replicating the one or more preamble codes (606); and training a decision feedback equalizer (DFE) based on the one or more replicated codes, the training enabling the DFE to use decision values at the DFE output to track channel variations (608).

Figure 7:
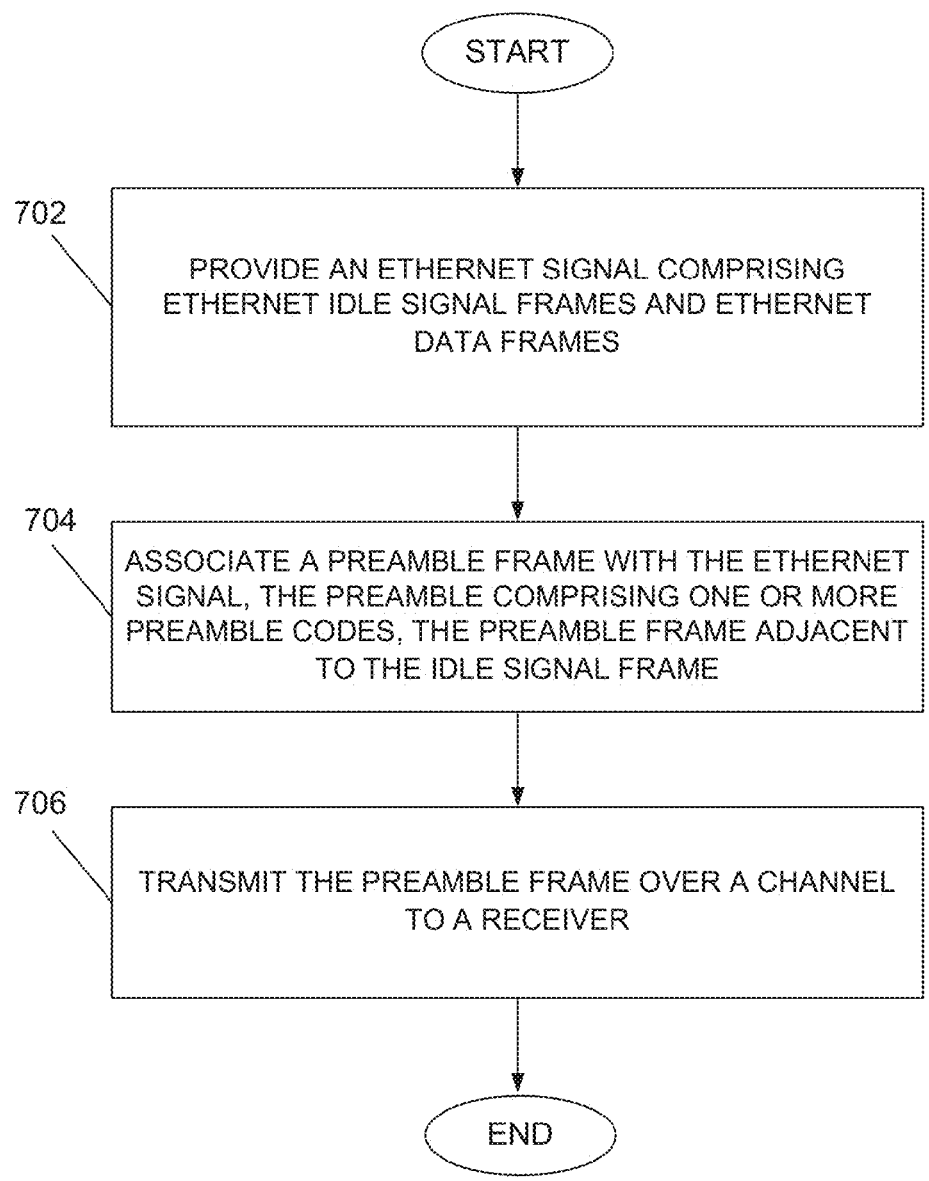
FIG. 7 is a flow diagram that illustrates an example embodiment of an extended Ethernet PHY method from a transmitting perspective.

It should be appreciated within the context of the present disclosure that another method embodiment 700, as depicted in FIG. 7, comprises providing an Ethernet signal comprising Ethernet idle signal frames and Ethernet data frames (702); associating (e.g., adding, such as providing preliminarily to the idle signal and data frames) a preamble frame with the Ethernet signal, the preamble comprising one or more preamble codes, the preamble frame adjacent to the idle signal frame (704); and transmitting the preamble frame over a channel to a receiver (706).

Any process descriptions or blocks in flow diagrams should be understood as representing modules, segments, or frames of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, depending on the functionality involved, as would be understood by those reasonably skilled in the art.

It should be emphasized that the above-described embodiments are merely possible examples of implementations, merely set forth for a clear understanding of the principles as disclosed. Many variations and modifications may be made to the above-described embodiment(s) without departing substantially from the spirit and principles disclosed. All such modifications and variations are intended to be included herein within the scope of this disclosure and protected by the following claims.

At least the following is claimed:

1. A receiver comprising: preamble synchronization logic configured to synchronize to a preamble frame of an Ethernet signal received from a transmitter over a channel, the preamble frame comprising one or more preamble codes, the preamble frame adjacent to an idle signal frame of the Ethernet signal; a preamble generator configured to replicate the one or more preamble codes; and a decision feedback equalizer (DFE) configured to undergo training based on the one or more replicated codes, the training enabling the DFE to use decision values at a DFE output to track channel variations, wherein the one or more preamble codes comprises a combination of one or more pseudo random codes and one or more impulse codes.

2. The receiver of claim 1, wherein the preamble synchronization logic is configured to periodically receive the preamble frame.

3. The receiver of claim 1, wherein the preamble frame comprises a frame that precedes an idle signal frame without an intervening frame.

4. The receiver of claim 1, wherein the preamble frame is longer in duration than the length of the DFE.

5. The receiver of claim 1, wherein the one or more preamble codes further comprises one or more wideband codes.

6. The receiver of claim 1, wherein the preamble synchronization logic comprises a cross correlator filter.

7. The receiver of claim 1, wherein the channel comprises a bridged tap channel.

8. The receiver of claim 1, wherein the channel comprises a power line or a coaxial cable.

9. A transmitter comprising frame encoding logic configured to provide an Ethernet signal comprising Ethernet idle signal frames and Ethernet data frames; a preamble generator configured to associate a preamble frame with the Ethernet signal, the preamble frame comprising one or more preamble codes for training a decision feedback equalizer of a receiver, the preamble frame adjacent to the idle signal frame; and transmitting logic configured to transmit the preamble frame over a channel to the receiver, wherein the preamble generator is configured to generate the preamble frame, the preamble frame comprising a combination of one or more pseudo random codes and one or more impulse codes.

10. The transmitter of claim 9, wherein the transmitting logic is configured to periodically transmit the preamble frame.

11. The transmitter of claim 9, wherein the preamble frame comprises a frame that precedes the idle signal frame without an intervening frame, and wherein the channel comprises a bridged tap channel, a power line, or a coaxial cable.

12. The transmitter of claim 9, wherein the preamble generator comprises a linear feedback shift register (LFSR), the preamble generator configured to generate the preamble frame using the LFSR with non-return to zero (NRZ) coding.

13. The transmitter of claim 9, wherein the preamble frame further comprises one or more wideband codes.

14. A method, comprising: receiving an Ethernet signal over a channel, the Ethernet signal comprising a preamble frame, an idle frame, and a data frame, the preamble frame comprising one or more preamble codes; synchronizing to the Ethernet signal based on the preamble frame; replicating the one or more preamble codes; and training a decision feedback equalizer (DFE) based on the one or more replicated codes, the training enabling the DFE to use decision values at a DFE output to track channel variations, wherein the one or more preamble codes comprises a combination of one or more pseudo random codes and one or more impulse codes.

* * * * *